(12) United States Patent
Nagao et al.

(10) Patent No.: US 10,738,154 B2
(45) Date of Patent: Aug. 11, 2020

(54) METHOD FOR PRODUCING POLYCARBONATE-POLYORGANOSILOXANE COPOLYMER

(71) Applicant: IDEMITSU KOSAN CO., LTD., Tokyo (JP)

(72) Inventors: Yukiko Nagao, Tokyo (JP); Toshiyuki Yasuda, Sodegaura (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 40 days.

(21) Appl. No.: 16/211,060

(22) Filed: Dec. 5, 2018

(65) Prior Publication Data

US 2019/0106537 A1    Apr. 11, 2019

Related U.S. Application Data

(63) Continuation of application No. 15/522,194, filed as application No. PCT/JP2015/080122 on Oct. 26, 2015, now abandoned.

(30) Foreign Application Priority Data

Oct. 31, 2014    (JP) .................................. 2014-223176

(51) Int. Cl.
| | |
|---|---|
| *C08G 64/08* | (2006.01) |
| *C08G 64/18* | (2006.01) |
| *C08G 77/06* | (2006.01) |
| *C08G 77/448* | (2006.01) |
| *C08G 64/24* | (2006.01) |

(52) U.S. Cl.
CPC ........... *C08G 64/085* (2013.01); *C08G 64/18* (2013.01); *C08G 64/186* (2013.01); *C08G 64/24* (2013.01); *C08G 77/06* (2013.01); *C08G 77/448* (2013.01)

(58) Field of Classification Search
CPC ..... C08G 77/448; C08G 64/085; C08G 64/24
See application file for complete search history.

(56) References Cited

U.S. PATENT DOCUMENTS

| 1,964,868 A | 7/1934 | Berndt et al. |
| 2012/0309922 A1 | 12/2012 | Kim et al. |
| 2015/0166733 A1* | 6/2015 | Nagao ..................... C08G 77/38 525/474 |
| 2016/0257790 A1 | 9/2016 | Nagao et al. |

FOREIGN PATENT DOCUMENTS

| JP | H06-279668 A | 10/1994 |
| JP | H06-329781 A | 11/1994 |
| JP | H07-173275 A | 7/1995 |
| JP | H07-173276 A | 7/1995 |
| JP | 2009-132756 A | 6/2009 |
| JP | 2009-285533 A | 12/2009 |
| JP | 2014-015498 A | 1/2014 |
| JP | 2014-080462 A | 5/2014 |
| TW | 201410747 A | 3/2014 |
| WO | 2014007128 | * 1/2014 |
| WO | WO2014/007128 | 1/2014 |

OTHER PUBLICATIONS

Taiwanese Office Action dated Feb. 25, 2019 in corresponding application No. 104135479.
Chinese Office Action re: Application No. 201580058267.9; 8 pages.
International Search Report issued in International Patent Application No. PCT/JP2015/080122 dated Nov. 17, 2015.
Office Action issued in Chinese Application No. 201580058267.9, dated Aug. 5, 2019 (21 pages).
Lanzhou Institute of Petroleum Machinery, "Modern Column Technology", Jan. 31, 2005, pp. 954-963, Section 5 Demister, Chapter 4, China Petrochemical Press Co. Ltd, Beijing, China.
Office Action dated May 29, 2020 for corresponding Chinese Patent Application No. 201580058267.9.

* cited by examiner

*Primary Examiner* — Kuo Liang Peng
(74) *Attorney, Agent, or Firm* — Foley & Lardner LLP

(57) ABSTRACT

Provided is a method of producing a polycarbonate-polyorganosiloxane copolymer, including a step (a) of producing a polycarbonate oligomer with an alkaline aqueous solution of a dihydric phenol, phosgene, and an organic solvent, the method further including a step of setting a content of a polycarbonate-polyorganosiloxane copolymer in the organic solvent to be introduced into the step (a) to less than 850 ppm by mass.

9 Claims, 1 Drawing Sheet

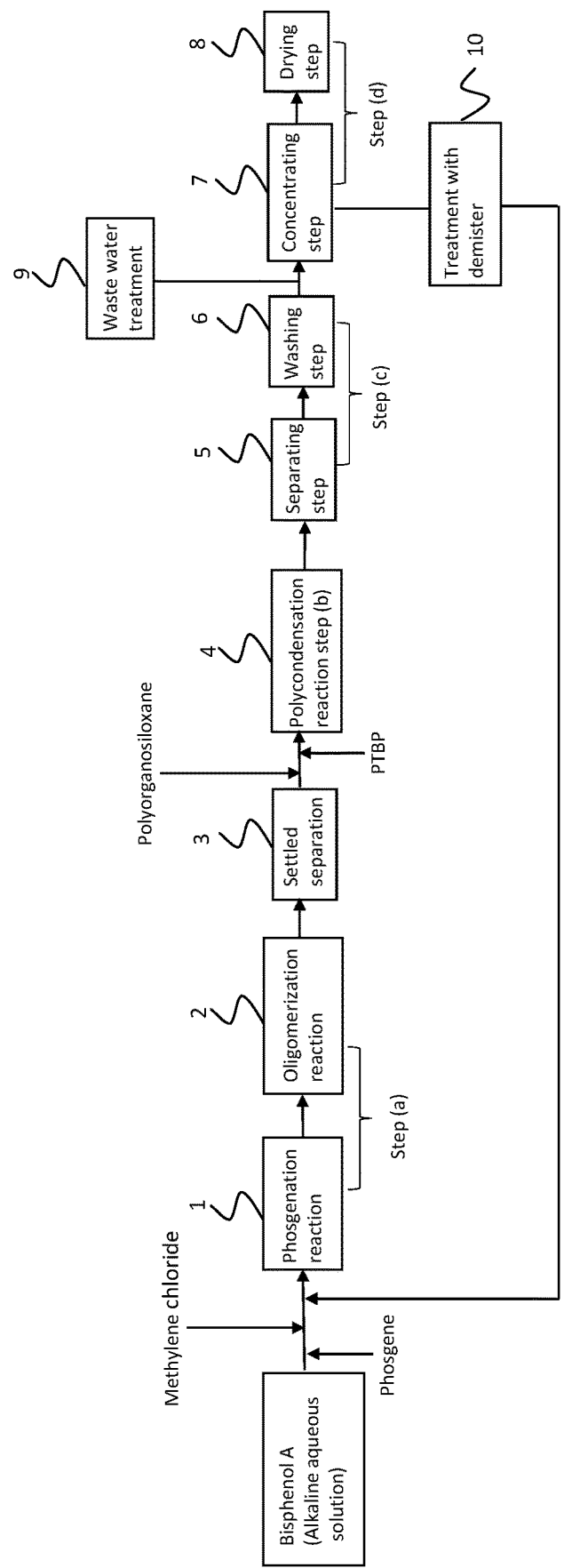

METHOD FOR PRODUCING POLYCARBONATE-POLYORGANOSILOXANE COPOLYMER

CROSS-REFERENCE TO RELATED APPLICATIONS

This application is a Continuation of U.S. patent application Ser. No. 15/522,194, filed on Apr. 26, 2017, which is a National Stage Entry of International Patent Application No. PCT/JP2015/080122, filed on Oct. 26, 2015, which is based upon and claims the benefit of priority of Japanese Patent Application No. 2014-223176, filed on Oct. 31, 2014. The entire contents of which are hereby incorporated by reference in their entireties.

TECHNICAL FIELD

The present invention relates to a method of producing a polycarbonate-polyorganosiloxane copolymer.

BACKGROUND ART

A polycarbonate-based resin is a polymer excellent in transparency, heat resistance, and impact resistance and is widely used at present as an engineering plastic in the industrial field.

As a method of producing the polycarbonate-based resin, a method involving allowing an aromatic dihydroxy compound, such as bisphenol A, and phosgene to react directly with each other (interfacial polymerization method) is known as a method of producing a high-quality polycarbonate. As a method of industrially producing a polycarbonate by an interfacial polymerization method, there is adopted a method involving allowing phosgene and an alkaline aqueous solution of a bisphenol to react with each other in the presence of an organic solvent to produce a polycarbonate oligomer having a reactive chloroformate group, and simultaneously or sequentially with production of the polycarbonate oligomer, further subjecting the polycarbonate oligomer and the bisphenol to a polycondensation reaction in the presence of a polymerization catalyst, such as a tertiary amine, and an alkaline aqueous solution.

The organic solvent used in a reaction step and a washing step is typically purified by a method, such as distillation, after its recovery to be reused in the reaction step and the like (including a phosgenation reaction step, a polycondensation reaction step, and the washing step) (see Patent Document 1). In addition, waste water after the reaction step, waste water produced in the washing step, or waste water produced in a granulating step contains an inorganic matter such as sodium chloride, and an organic matter such as a phenol or a polycarbonate. In order to purify the waste water by removing the organic matter from an aqueous phase, an organic solvent is used to extract and remove the organic matter from the waste water. The organic solvent containing the phenol and the polymer that have been extracted and removed is reused in the polycondensation reaction step (see Patent Document 2).

Among the polycarbonate-based resins, a polycarbonate-polyorganosiloxane polymer (hereinafter sometimes referred to as "PC-POS") has been attracting attention because of its high impact resistance, high chemical resistance, and high flame retardancy, and the polymer has been expected to find utilization in a wide variety of fields, such as the field of electrical and electronic equipment and the field of an automobile.

As a method of producing the PC-POS, there is known a method involving allowing a dihydric phenol-based compound and phosgene to react with each other to produce a polycarbonate oligomer, and polymerizing the polycarbonate oligomer with a polyorganosiloxane in the presence of methylene chloride, an alkaline compound aqueous solution, a dihydric phenol-based compound, and a polymerization catalyst (see Patent Document 3).

CITATION LIST

Patent Document

Patent Document 1: JP 2009-132756 A
Patent Document 2: JP 2009-285533 A
Patent Document 3: JP 06-329781 A

SUMMARY OF INVENTION

Technical Problem

Also in the case of the production of a PC-POS, the following is preferred from economic and environmental viewpoints: organic matters (a dihydric phenol-based compound and the PC-POS) are extracted and removed from waste water by using the same organic solvent as that used in a conventional production process for a typical polycarbonate-based resin, and the organic solvent containing the dihydric phenol-based compound and the PC-POS thus obtained is reused.

However, an investigation made by the inventors of the present invention has found that when the recovered organic solvent is reused in a phosgenation reaction step in a production process for a polycarbonate oligomer, bubbling in an oligomerization reactor subsequent to the step and a fluctuation in flow rate at the outlet of the reactor occur to make it difficult to efficiently produce the PC-POS.

An object to be achieved by the present invention is to provide a method by which a polycarbonate-polyorganosiloxane copolymer is efficiently produced while bubbling in an oligomerization reactor and a fluctuation in flow rate at the outlet of the reactor are avoided.

Solution to Problem

The inventors of the present invention have made extensive investigations, and as a result, have found that when the content of a polycarbonate-polyorganosiloxane copolymer in an organic solvent to be introduced into a phosgenation reaction step in a production process for a polycarbonate oligomer is controlled to less than a certain value, bubbling in an oligomerization reactor and a fluctuation in flow rate at the outlet of the reactor hardly occur, and hence the polycarbonate-polyorganosiloxane copolymer can be efficiently produced. Thus, the inventors have completed the present invention.

That is, the present invention relates to the following items [1] to [10].

[1] A method of producing a polycarbonate-polyorganosiloxane copolymer, comprising
a step (a) of producing a polycarbonate oligomer with an alkaline aqueous solution of a dihydric phenol, phosgene, and an organic solvent, and
the method further comprising a step of setting a content of a polycarbonate-polyorganosiloxane copolymer in the organic solvent to be introduced into the step (a) to less than 850 ppm by mass.

[2] The method of producing a polycarbonate-polyorganosiloxane copolymer according to Item [1], further comprising:

a step (b) of causing the polycarbonate oligomer obtained in the step (a), the alkaline aqueous solution of the dihydric phenol, and a polyorganosiloxane to react with each other to provide a polycarbonate-polyorganosiloxane copolymer;

a step (c) of continuously or intermittently discharging a solution containing the polycarbonate-polyorganosiloxane copolymer from a reactor of the step (b), separating the discharged solution into an aqueous phase and an organic solvent phase, washing the separated organic solvent phase, and then further separating the washed phase into an aqueous phase and an organic solvent phase; and a step (d) of concentrating and drying the organic solvent phase containing the polycarbonate-polyorganosiloxane copolymer obtained in the step (c) to remove the organic solvent, wherein part or a total amount of the organic solvent removed in the step (d) is used as the organic solvent to be introduced into the step (a).

[3] The method of producing a polycarbonate-polyorganosiloxane copolymer according to Item [1] or [2], wherein the organic solvent to be introduced into the step (a) is obtained by treating part or a total amount thereof with a demister.

[4] The method of producing a polycarbonate-polyorganosiloxane copolymer according to any one of Items [1] to [3], wherein the organic solvent to be introduced into the step (a) is obtained by subjecting part or a total amount thereof to a distillation treatment.

[5] The method of producing a polycarbonate-polyorganosiloxane copolymer according to any one of Items [1] to [4], wherein the organic solvent to be introduced into the step (a) is methylene chloride.

[6] The method of producing a polycarbonate-polyorganosiloxane copolymer according to any one of Items [1] to [5], wherein the dihydric phenol is a dihydric phenol represented by the general formula (1):

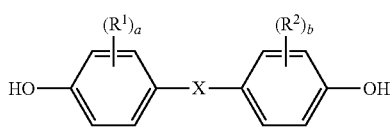

(1)

wherein $R^1$ and $R^2$ each independently represent an alkyl group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —SO$_2$—, —O—, or —CO—, and a and b each independently represent an integer of from 0 to 4.

[7] The method of producing a polycarbonate-polyorganosiloxane copolymer according to any one of Items [1] to [6], wherein the polyorganosiloxane is at least one of polyorganosiloxane selected from the general formulae (2), (3), and (4):

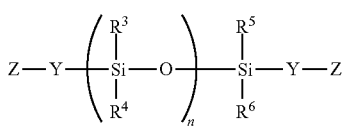

(2)

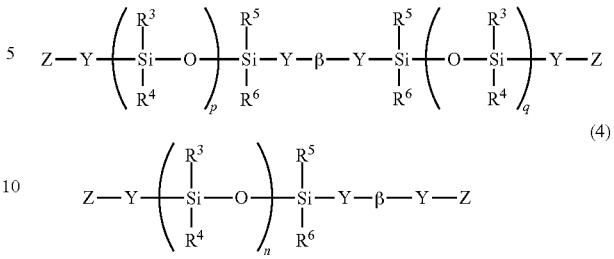

wherein $R^3$ to $R^6$ each independently represent a hydrogen atom, a halogen atom, an alkyl group having 1 to 6 carbon atoms, an alkoxy group having 1 to 6 carbon atoms, or an aryl group having 6 to 12 carbon atoms, and a plurality of $R^3$, $R^4$, $R^5$, and/or $R^6$ may be identical to or different from each other, Y represents —$R^7$O—, —$R^7$COO—, —$R^7$NH—, —$R^7$NR$^8$—, —COO—, —S—, —$R^7$COO—$R^9$—O—, or —$R^7$O—$R^{10}$—O—, and a plurality of Y may be identical to or different from each other, the $R^7$ represents a single bond, a linear, branched, or cyclic alkylene group, an aryl-substituted alkylene group, a substituted or unsubstituted arylene group, or a diarylene group, $R^8$ represents an alkyl group, an alkenyl group, an aryl group, or an aralkyl group, $R^9$ represents a diarylene group, $R^{10}$ represents a linear, branched, or cyclic alkylene group, or a diarylene group, Z represents a hydrogen atom or a halogen atom, and a plurality of Z may be identical to or different from each other, β represents a divalent group derived from a diisocyanate compound, or a divalent group derived from a dicarboxylic acid or a halide of a dicarboxylic acid, p and q each represent an integer of 1 or more, and a sum of p and q is from 20 to 500, and n represents an average number of repetitions of from 20 to 500.

[8] The method of producing a polycarbonate-polyorganosiloxane copolymer according to any one of Items [1] to [7], wherein the dihydric phenol is bisphenol A.

[9] The method of producing a polycarbonate-polyorganosiloxane copolymer according to any one of Items [1] to [8], wherein the alkaline aqueous solution is aqueous sodium hydroxide.

[10] The method of producing a polycarbonate-polyorganosiloxane copolymer according to any one of Items [1] to [9], wherein the polycarbonate oligomer has a weight-average molecular weight of 5,000 or less.

Advantageous Effects of Invention

According to the present invention, the method by which a polycarbonate-polyorganosiloxane copolymer is efficiently produced while bubbling in an oligomerization reactor and a fluctuation in flow rate at the outlet of the reactor are avoided can be provided.

BRIEF DESCRIPTION OF DRAWINGS

The FIGURE is a schematic view of a production process for a polycarbonate-polyorganosiloxane copolymer performed in Example 1 of the present invention.

DESCRIPTION OF EMBODIMENTS

The present invention is directed to a method of producing a polycarbonate-polyorganosiloxane copolymer, comprising a step (a) of producing a polycarbonate oligomer with an alkaline aqueous solution of a dihydric phenol, phosgene, and an organic solvent, the method further comprising a step of setting a content of the polycarbonate-polyorganosiloxane copolymer in the organic solvent to be introduced into the step (a) to less than 850 ppm by mass.

In addition, the method of producing a polycarbonate-polyorganosiloxane copolymer of the present invention preferably further comprises: a step (b) of causing the polycarbonate oligomer obtained in the step (a), the alkaline aqueous solution of the dihydric phenol, and a polyorganosiloxane to react with each other to provide the polycarbonate-polyorganosiloxane copolymer; a step (c) of continuously or intermittently discharging a solution containing the polycarbonate-polyorganosiloxane copolymer from a reactor of the step (b), separating the discharged solution into an aqueous phase and an organic solvent phase, washing the separated organic solvent phase, and then further separating the washed phase into an aqueous phase and an organic solvent phase; and a step (d) of concentrating and drying the organic solvent phase containing the polycarbonate-polyorganosiloxane copolymer obtained in the step (c) to remove the organic solvent, wherein part or a total amount of the organic solvent removed in the step (d) is used as the organic solvent to be introduced into the step (a).

The method of producing a polycarbonate-polyorganosiloxane copolymer (PC-POS) of the present invention is described in detail below.

[Step (a)]

In the step (a), first, a phosgenation reaction is performed by mixing the alkaline aqueous solution of the dihydric phenol, phosgene, and the organic solvent. The phosgenation reaction is a reaction in which a chloroformate group is introduced mainly into the dihydric phenol.

A reaction temperature in the step (a) is selected from the range of typically from 0° C. to 80° C., preferably from 5° C. to 70° C.

The respective raw materials to be used in the phosgenation reaction are described below.

<Dihydric Phenol>

A dihydric phenol represented by the following general formula (1) is preferably used as the dihydric phenol.

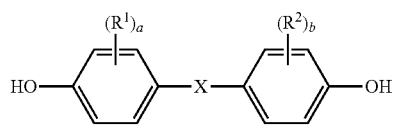

(1)

wherein $R^1$ and $R^2$ each independently represent an alkyl group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —SO$_2$—, —O—, or —CO—, and a and b each independently represent an integer of from 0 to 4.

Although the dihydric phenol represented by the general formula (1) is not particularly limited, 2,2-bis(4-hydroxyphenyl)propane [trivial name: bisphenol A] is suitable.

Examples of the dihydric phenol other than bisphenol A include: bis(hydroxyaryl)alkanes, such as bis(4-hydroxyphenyl)methane, 1,1-bis(4-hydroxyphenyl)ethane, 2,2-bis(4-hydroxyphenyl)butane, 2,2-bis(4-hydroxyphenyl)octane, bis(4-hydroxyphenyl)phenylmethane, bis(4-hydroxyphenyl) diphenylmethane, 2,2-bis(4-hydroxy-3-methylphenyl)propane, bis(4-hydroxyphenyl)naphthylmethane, 1,1-bis(4-hydroxy-t-butylphenyl)propane, 2,2-bis(4-hydroxy-3-bromophenyl)propane, 2,2-bis(4-hydroxy-3,5-dimethylphenyl)propane, 2,2-bis(4-hydroxy-3-chlorophenyl)propane, 2,2-bis(4-hydroxy-3,5-dichlorophenyl)propane, and 2,2-bis(4-hydroxy-3,5-dibromophenyl) propane; bis(hydroxyaryl)cycloalkanes, such as 1,1-bis(4-hydroxyphenyl)cyclopentane, 1,1-bis(4-hydroxyphenyl)cyclohexane, 1,1-bis(4-hydroxyphenyl)-3,5,5-trimethylcyclohexane, 2,2-bis(4-hydroxyphenyl)norbornane, and 1,1-bis(4-hydroxyphenyl)cyclododecane; dihydroxyarylethers, such as 4,4'-dihydroxydiphenyl ether and 4,4'-dihydroxy-3,3'-dimethylphenyl ether; dihydroxydiaryl sulfides, such as 4,4'-dihydroxydiphenyl sulfide and 4,4'-dihydroxy-3,3'-dimethyldiphenyl sulfide; dihydroxydiaryl sulfoxides, such as 4,4'-dihydroxydiphenyl sulfoxide and 4,4'-dihydroxy-3,3'-dimethyldiphenyl sulfoxide; dihydroxydiaryl sulfones, such as 4,4'-dihydroxydiphenyl sulfone and 4,4'-dihydroxy-3,3'-dimethyldiphenylsulfone; dihydroxydiphenyls, such as 4,4'-dihydroxydiphenyl; dihydroxydiarylfluorenes, such as 9,9-bis(4-hydroxyphenyl)fluorene and 9,9-bis(4-hydroxy-3-methylphenyl)fluorene; dihydroxydiaryladamantanes, such as 1,3-bis(4-hydroxyphenyl)adamantane, 2,2-bis(4-hydroxyphenyl)adamantane, and 1,3-bis(4-hydroxyphenyl)-5,7-dimethyladamantane; 4,4'-[1,3-phenylenebis(1-methylethylidene)]bisphenol; 10,10-bis(4-hydroxyphenyl)-9-anthrone; and 1,5-bis(4-hydroxyphenylthio)-2,3-dioxapentane.

One of those dihydric phenols may be used alone, or two or more thereof may be used as a mixture.

<Alkaline Aqueous Solution>

The dihydric phenol is used as an alkaline aqueous solution, and an alkaline compound to be used at this time may be, for example, an alkali hydroxide, in particular a hydroxide having strong basicity, such as sodium hydroxide or potassium hydroxide. Among them, sodium hydroxide is preferably used.

In normal cases, a solution having an alkali concentration of from 1 mass % to 15 mass % is preferably used as the alkaline aqueous solution. In addition, the content of the dihydric phenol in the alkaline aqueous solution is typically selected from the range of from 0.5 mass % to 20 mass %.

<Phosgene>

Phosgene is a compound typically obtained by causing chlorine and carbon monoxide to react with each other at a ratio of carbon monoxide of from 1.01 mol to 1.3 mol with respect to 1 mol of chlorine through the use of activated carbon as a catalyst. When a phosgene gas is used as a phosgene, a phosgene gas which incorporates about 1 vol % to about 30 vol % of unreacted carbon monoxide may be used. Phosgene in a liquefied state may also be used.

<Organic Solvent>

The organic solvent is used as a solvent for diluting the polycarbonate oligomer and the polyorganosiloxane. Specific examples thereof include halogenated hydrocarbon solvents, such as dichloromethane (methylene chloride), dichloroethane, trichloroethane, tetrachloroethane, pentachloroethane, hexachloroethane, dichloroethylene, chlorobenzene, and dichlorobenzene. Among them, dichloromethane (methylene chloride) is particularly preferred.

The usage amount of the organic solvent is typically selected so that a volume ratio between an organic solvent phase and an aqueous phase may be preferably from 5/1 to 1/7, more preferably from 2/1 to 1/4.

<Other Raw Materials>

In the step (a), in the addition to the respective raw materials, a polymerization catalyst may be used as required. Examples of the polymerization catalyst include tertiary amines and quaternary ammonium salts. Examples of the tertiary amine include trimethylamine, triethylamine, and tripropylamine. Examples of the quaternary ammonium salt include trimethylbenzylammonium chloride and triethylbenzylammonium chloride. As the polymerization catalyst, a tertiary amine is preferred, and triethylamine is more preferred.

In the phosgenation reaction, substantially no oligomerization reaction proceeds, and hence the polycarbonate oligomer is produced by mixing a reaction product obtained in the phosgenation reaction, the dihydric phenol, and an alkali component to perform an oligomerization reaction. In the oligomerization reaction, an end terminator may be added as required.

A stirring tank is generally used as a reactor to be used in the oligomerization reaction. The stirring tank is not particularly limited as long as the tank has a stirrer.

As one means for suppressing bubbling in the oligomerization reactor, a vortex breaker is preferably placed in the stirring tank.

The end terminator is not particularly limited as long as the end terminator is a monohydric phenol, and examples thereof include phenol, p-cresol, p-tert-butylphenol, p-tert-octylphenol, p-cumylphenol, p-phenylphenol, 3-pentadecylphenol, bromophenol, tribromophenol, and nonylphenol. Among them, p-tert-butylphenol, p-cumylphenol, and p-phenylphenol are preferred, and p-tert-butylphenol is more preferred.

The weight-average molecular weight (Mw) of the obtained polycarbonate oligomer is preferably 5,000 or less, more preferably from 500 to 3,000, still more preferably from 700 to 2,000, even still more preferably from 800 to 1,500.

It is preferred that a reaction mixture obtained in the oligomerization reaction be introduced into a static separation tank to be separated into an organic solvent phase containing the polycarbonate oligomer and an aqueous phase containing impurities and the like. The organic solvent phase is utilized in the step (b). Meanwhile, there may be the case where the polycarbonate oligomer and the dihydric phenol are also incorporated into the aqueous phase. Accordingly, with respect to the aqueous phase, it is preferred that such organic matters be extracted with an organic solvent, and the resultant extract be used as a part or the whole of the organic solvent to be used in the step (b). It is preferred to perform the extraction operation by mixing the aqueous phase with an aqueous phase that is obtained by washing with an acidic aqueous solution in a step (d) described below and then separating.

[Step (b)]

In the step (b), a copolymerization reaction is completed by adding the polycarbonate oligomer obtained in the step (a), the alkaline aqueous solution of the dihydric phenol, and the polyorganosiloxane, and subjecting the materials to interfacial polymerization in the presence of an alkaline aqueous solution and an organic solvent, and as required, a polymerization catalyst and an end terminator.

An example of the step (b) is specifically described. The polycarbonate oligomer solution obtained in the step (a), the alkaline aqueous solution of the dihydric phenol, the polyorganosiloxane solution diluted with the organic solvent, the organic solvent, and the alkaline aqueous solution are mixed arbitrarily in the presence of the polymerization catalyst, and the mixture is subjected to the interfacial polymerization at a temperature in the range of typically from 0° C. to 50° C., preferably from 20° C. to 40° C. The end terminator and the polymerization catalyst may be used as required.

Examples of the alkaline aqueous solution, the organic solvent, the polymerization catalyst, the dihydric phenol, and the end terminator in this step may include those described in the step (a).

With regard to the reactor to be used in the step (b) (polycondensation reaction step), the reaction can be completed only with one reactor depending on the performance of the reactor. However, the polycondensation reaction step may be performed by further building a plurality of reactors, such as a second reactor subsequent thereto and a third reactor, as required. A stirring tank, a tower-type stirring tank with a vertical multistage impeller, a stationary tank, a static mixer, a line mixer, an orifice mixer, piping, or the like may be used as the reactor to be used in the polycondensation reaction step. Those reactors may be arbitrarily combined to be used as a plurality of reactors.

At least one selected from the following general formulae (2), (3), and (4) is preferably used as the polyorganosiloxane.

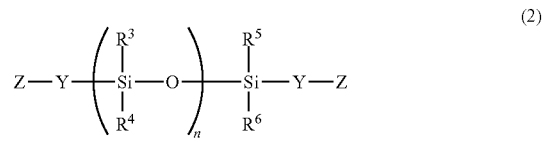

(2)

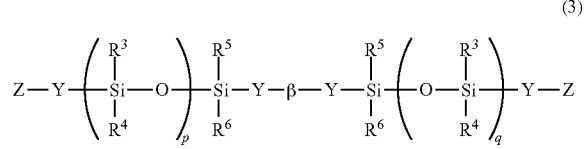

(3)

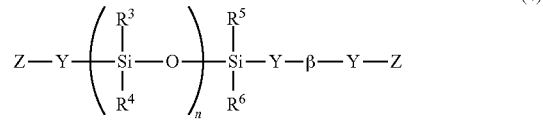

(4)

wherein $R^3$ to $R^6$ each independently represent a hydrogen atom, a halogen atom, an alkyl group having 1 to 6 carbon atoms, an alkoxy group having 1 to 6 carbon atoms, or an aryl group having 6 to 12 carbon atoms, and a plurality of $R^3$, $R^4$, $R^5$, and/or $R^6$ may be identical to or different from each other, Y represents —$R^7$O—, —$R^7$COO—, —$R^7$NH—, —$R^7NR^8$—, —COO—, —S—, —$R^7$COO—$R^9$—O—, or —$R^7$O—$R^{10}$—O—, and a plurality of Y may be identical to or different from each other, the $R^7$ represents a single bond, a linear, branched, or cyclic alkylene group, an aryl-substituted alkylene group, a substituted or unsubstituted arylene group, or a diarylene group, $R^8$ represents an alkyl group, an alkenyl group, an aryl group, or an aralkyl group, $R^9$ represents a diarylene group, $R^{10}$ represents a linear, branched, or cyclic alkylene group, or a diarylene group, Z represents a hydrogen atom or a halogen atom, and a plurality of Z may be identical to or different from each other, β represents a divalent group derived from a diisocyanate compound, or a divalent group derived from a dicarboxylic acid or a halide of a dicarboxylic acid, p and q each represent an integer of 1 or more, and a sum of p and q is from 20 to 500, and n represents an average number of repetitions of from 20 to 500.

Examples of the halogen atom that $R^3$ to $R^6$ each independently represent include a fluorine atom, a chlorine atom, a bromine atom, and an iodine atom. Examples of the alkyl group that $R^3$ to $R^6$ each independently represent include a methyl group, an ethyl group, a n-propyl group, an isopropyl group, various butyl groups ("various" means that a linear group and any branched group are included, and the same shall apply hereinafter), various pentyl groups, and various hexyl groups. An example of the alkoxy group that $R^3$ to $R^6$ each independently represent is an alkoxy group whose alkyl group moiety is the alkyl group described above. Examples of the aryl group that $R^3$ to $R^6$ each independently represent include a phenyl group and a naphthyl group.

$R^3$ to $R^6$ each preferably represent a hydrogen atom, an alkyl group having 1 to 6 carbon atoms, an alkoxy group having 1 to 6 carbon atoms, or an aryl group having 6 to 12 carbon atoms.

The polyorganosiloxanes represented by the general formulae (2), (3), and (4) are each preferably a polyorganosiloxane in which $R^3$ to $R^6$ each represent a methyl group.

The linear or branched alkylene group represented by R' in —$R^7$O—, —$R^7$COO—, —$R^7$NH—, —$R^7$NR$^8$—, —COO—, —S—, —$R^7$COO—$R^9$—O—, or —$R^7$O—$R^{10}$—O— represented by Y is, for example, an alkylene group having 1 to 8 carbon atoms, preferably 1 to 5 carbon atoms, and the cyclic alkylene group represented by R' is, for example, a cycloalkylene group having 5 to 15 carbon atoms, preferably 5 to 10 carbon atoms.

The aryl-substituted alkylene group represented by R' may have a substituent, such as an alkoxy group or an alkyl group, on its aromatic ring, and its specific structure may be, for example, a structure represented by the following general formula (5) or (6). When the polyorganosiloxane has the aryl-substituted alkylene group, the alkylene group is bonded to Si.

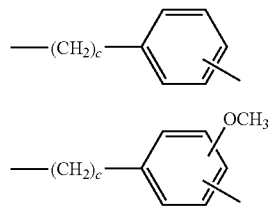

(5)

(6)

wherein c represents a positive integer and typically represents an integer of from 1 to 6.

The diarylene group represented by each of $R^7$, $R^9$, and $R^{10}$ refers to a group in which two arylene groups are linked to each other directly or through a divalent organic group, and is specifically a group having a structure represented by —$Ar^1$—W—$Ar^2$—. Here, $Ar^1$ and $Ar^2$ each represent an arylene group, and W represents a single bond or a divalent organic group. Examples of the divalent organic group represented by W include an isopropylidene group, a methylene group, a dimethylene group, and a trimethylene group.

Examples of the arylene group represented by each of $R^7$, $Ar^1$, and $Ar^2$ include arylene groups each having 6 to 14 ring-forming carbon atoms, such as a phenylene group, a naphthylene group, a biphenylene group, and an anthrylene group. Those arylene groups may each have an arbitrary substituent, such as an alkoxy group or an alkyl group.

The alkyl group represented by $R^8$ is a linear or branched alkyl group having 1 to 8, preferably 1 to 5 carbon atoms. The alkenyl group represented by $R^8$ is, for example, a linear or branched alkenyl group having 2 to 8, preferably 2 to 5 carbon atoms. The aryl group represented by $R^8$ is, for example, a phenyl group or a naphthyl group. The aralkyl group represented by $R^8$ is, for example, a phenylmethyl group or a phenylethyl group.

The linear, branched, or cyclic alkylene group represented by $R^{10}$ is the same as that represented by $R^7$.

Y preferably represents —$R^7$O—, and $R^7$ represents an aryl-substituted alkylene group, in particular a residue of a phenol-based compound having an alkyl group, and more preferably represents an organic residue derived from allylphenol or an organic residue derived from eugenol.

With regard to p and q in the general formula (3), it is preferred that p=q, i.e., p=n/2 and q=n/2.

The average number n of repetitions is preferably from 20 to 500, more preferably from 50 to 400, still more preferably from 70 to 300. When the n is 20 or more, the PC-POS can obtain excellent impact resistance, and significant restoration of the impact resistance can be achieved. When the n is 500 or less, handleability at the time of the production of the PC-POS is excellent. The number n of repeating units can be calculated by $^1$H-NMR.

In addition, β represents a divalent group derived from a diisocyanate compound, or a divalent group derived from a dicarboxylic acid or a halide of a dicarboxylic acid, and examples thereof include divalent groups represented by the following general formulae (7-1) to (7-5).

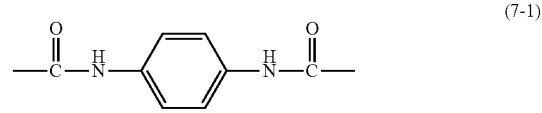

(7-1)

(7-2)

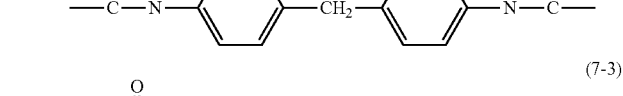

(7-3)

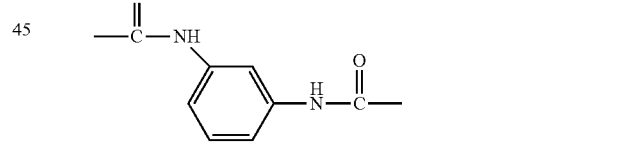

(7-4)

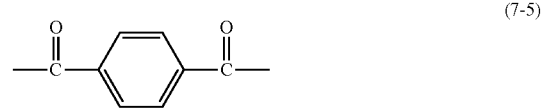

(7-5)

Examples of the polyorganosiloxane represented by the general formula (2) include compounds represented by the following general formulae (2-1) to (2-11).

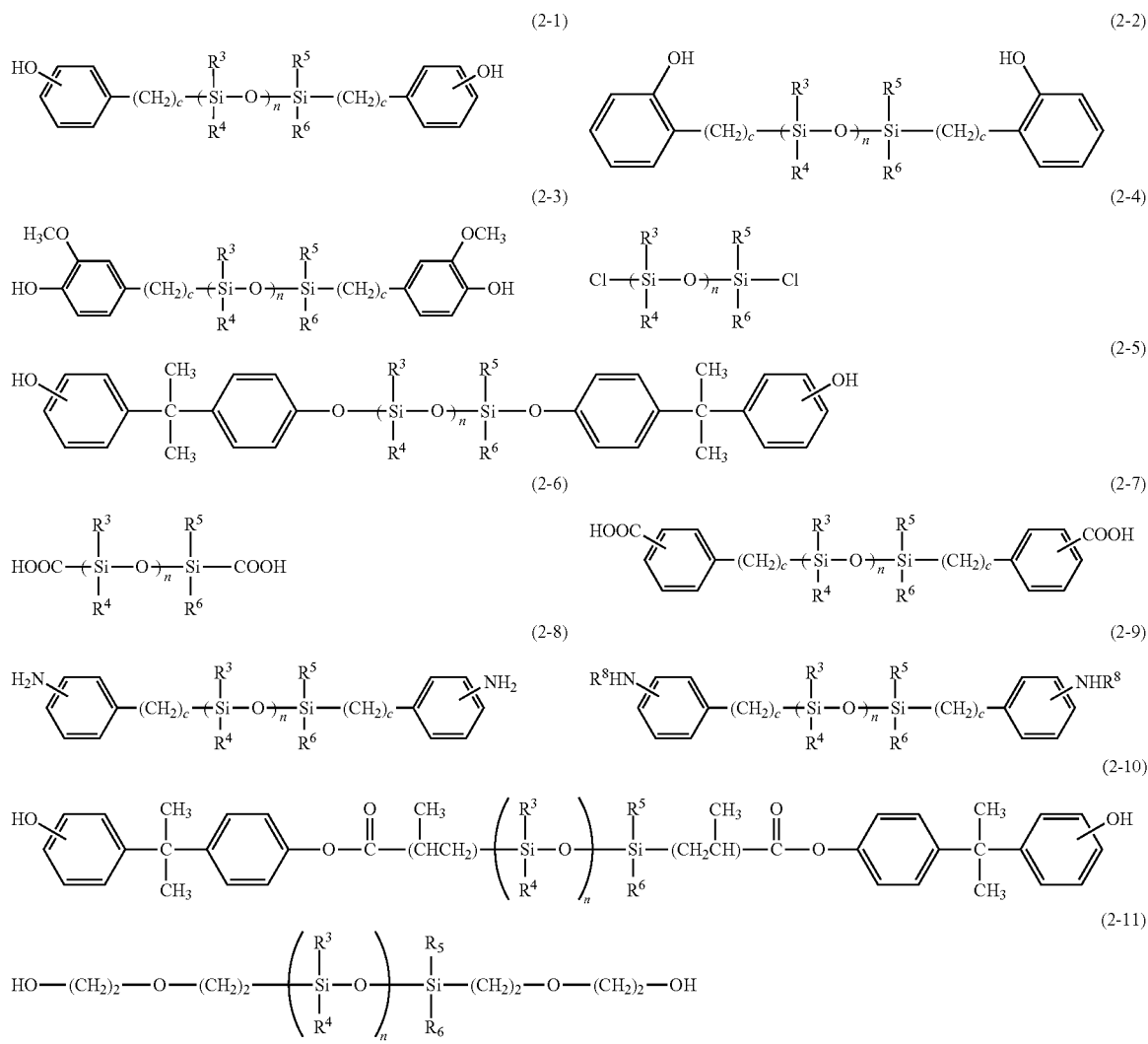

In the general formulae (2-1) to (2-11), $R^3$ to $R^6$, n, and $R^8$ are as defined above, and preferred groups and values thereof are also the same. c represents a positive integer and typically represents an integer of from 1 to 6.

Among them, a phenol-modified polyorganosiloxane represented by the general formula (2-1) is preferred from the viewpoint of the ease of polymerization. In addition, α,ω-bis [3-(o-hydroxyphenyl) propyl]polydimethylsiloxane as one of the compounds each represented by the general formula (2-2) or α,ω-bis [3-(4-hydroxy-3-methoxyphenyl) propyl] polydimethylsiloxane as one of the compounds each represented by the general formula (2-3) is preferred from the viewpoint of the ease of availability.

The viscosity-average molecular weight (Mv) of the polycarbonate-polyorganosiloxane is typically from 10,000 to 30,000, preferably from 12,000 to 28,000, more preferably from 15,000 to 25,000. In the present invention, the viscosity-average molecular weight (Mv) is a value calculated from Schnell's equation ($[\eta]=1.23\times10^{-5}\times Mv^{0.83}$) by measuring the limiting viscosity $[\eta]$ of a methylene chloride solution at 20° C. with an Ubbelohde-type viscosity tube.

A method of producing the polyorganosiloxane to be used in the present invention is not particularly limited. According to, for example, a method disclosed in JP 11-217390 A, the polyorganosiloxane can be obtained by: causing cyclotrisiloxane and disiloxane to react with each other in the presence of an acid catalyst to synthesize α,ω-dihydrogen organopentasiloxane; and then subjecting a phenol compound having an unsaturated group (such as 2-allylphenol, 4-allylphenol, eugenol, or 2-propenylphenol) or the like to an addition reaction with the α,ω-dihydrogen organopentasiloxane in the presence of a catalyst for a hydrosilylation reaction. In addition, according to a method disclosed in JP 2662310 B2, the polyorganosiloxane can be obtained by: causing octamethylcyclotetrasiloxane and tetramethyldisiloxane to react with each other in the presence of sulfuric acid (acid catalyst); and subjecting a phenol compound having an unsaturated group or the like to an addition reaction with the resultant α,ω-dihydrogen organopolysiloxane in the presence of the catalyst for a hydrosilylation reaction in the same manner as described above. The chain length n of the α,ω-dihydrogen organopolysiloxane may be appropriately adjusted depending on a polymerization condition therefor before its use, or a commercially available α,ω-dihydrogen organopolysiloxane may be used.

Examples of the catalyst for a hydrosilylation reaction include transition metal-based catalysts. Among them, a platinum-based catalyst is preferably used in terms of a reaction rate and selectivity. Specific examples of the platinum-based catalyst include chloroplatinic acid, a solution of chloroplatinic acid in an alcohol, an olefin complex of platinum, a complex of platinum and a vinyl group-containing siloxane, platinum-supported silica, and platinum-supported activated carbon.

[Step (c)]

In the step (c), first, the solution containing the polycarbonate-polyorganosiloxane copolymer is continuously or intermittently discharged from the reactor of the step (b), and the discharged solution is separated into an aqueous phase and an organic solvent phase. The method for the separation is not particularly limited, and a settled separation may be adopted. From the viewpoint of making the separated state between the aqueous phase and the organic solvent phase satisfactory, it is preferred to perform centrifugation. Although the centrifugation condition is not particularly limited, in general, a rotational speed is preferably from about 1,000 rpm to about 3,000 rpm.

In many cases, the organic solvent phase obtained after the separation contains a trace amount of the dihydric phenol, and therefore, it is preferred to wash the organic solvent phase with an alkaline aqueous solution. Examples of the alkaline compound to be used for the alkaline aqueous solution include the same materials as those used in the step (a), and it is preferred to use the same material. After the washing with the alkaline aqueous solution, the resultant is separated into an aqueous phase and an organic solvent phase. On this occasion, the method for the separation is not particularly limited, and a settled separation may be adopted. From the viewpoint of making the separated state between the aqueous phase and the organic solvent phase satisfactory, it is preferred to perform centrifugation at the above-mentioned rotational speed. Although the amount of the alkaline aqueous solution to be used for the washing is not particularly limited, the amount is preferably from about 5 vol % to about 40 vol %, more preferably from 5 vol % to 30 vol %, still more preferably from 10 vol % to 20 vol % in the whole liquid, from the viewpoints of a washing effect and a reduction in the generation amount of waste water. When the amount of the alkaline aqueous solution is 40 vol % or less, the continuous phase does not change from the organic solvent phase to the aqueous phase, and the extraction efficiency from the organic solvent phase can be kept high.

The aqueous phase obtained after the separation is preferably reused in the step (a) from the viewpoint of production cost because the aqueous phase contains the dihydric phenol and the alkaline compound.

Next, the organic solvent phase obtained by the separation is washed with an acidic aqueous solution, and is then separated into an aqueous phase and an organic solvent phase. The washing with the acidic aqueous solution can remove the polymerization catalyst and a trace amount of the alkaline compound that may be present in the organic solvent phase obtained by the separation. The method for the separation is not particularly limited, and a settled separation may be adopted. Examples of the acid which is used for preparation of the acidic aqueous solution include hydrochloric acid and phosphoric acid, with hydrochloric acid being preferred. However, the acid is not particularly limited thereto.

Because the acid and the inorganic matter used for washing tend to be contained in the organic solvent phase obtained by the above-mentioned separation, it is preferred to conduct washing with water at least one time. Here, the degree of cleanliness of the organic solvent phase can be evaluated according to an electric conductivity of the aqueous phase after washing. The intended electric conductivity is preferably 1 mS/m or less, more preferably 0.5 mS/m or less. After washing with water, the resultant is separated into an aqueous phase and an organic solvent phase. On this occasion, the method for the separation is not particularly limited, and a settled separation may be adopted.

The electric conductivity is a value measured with an electric conductivity-measuring device "DS-7" (manufactured by Horiba, Ltd.).

[Step (d)]

In the step (d), the organic solvent is removed by concentrating the organic solvent phase obtained in the step (c) (concentrating step), the residue is pulverized, and the pulverized product is dried preferably at from about 80° C. to about 160° C. under reduced pressure (drying step), or is further granulated. Thus, a PC-POS powder can be obtained. The resultant PC-POS powder can be pelletized with a pelletizer or the like into various molded bodies.

In the step (d), the concentration is performed so that the solid content concentration of the organic solvent phase may become preferably from 30 mass % to 40 mass %, more preferably from 30 mass % to 35 mass %.

In addition, in the drying step, the drying is performed so that the solid content concentration of the organic solvent phase may preferably become 99.9 mass % or more (the concentration of methylene chloride in the resin may preferably become less than 1,000 ppm).

In the present invention, part or the whole of the organic solvent removed in the concentrating step is preferably reused as at least part of the organic solvent of the step (a). Further, part or the whole of the organic solvent obtained in the drying step is also preferably reused as at least part of the organic solvent of the step (a).

In the present invention, the content of the PC-POS in the total amount of the organic solvent to be reused in the step (a) is set to less than 850 ppm by mass, preferably less than 800 ppm by mass, more preferably less than 600 ppm by mass, still more preferably less than 500 ppm by mass. The setting of the content of the PC-POS to less than 850 ppm by mass enables the avoidance of bubbling in the reactor to be used in the step (a) and a fluctuation in flow rate at the outlet of the reactor.

Although a detailed reason why the bubbling in the reactor and the fluctuation in flow rate at the outlet of the reactor occur is unknown, as a result of their observation, the inventors of the present invention have found that when the organic solvent containing the PC-POS is introduced into the step (a), at the time of the stirring of the reaction product containing the PC-POS, the dihydric phenol compound, and the alkali component in the oligomerization reactor, the solution in the reactor entrains a gas to bubble, and the discharge pressure of an extraction pump fluctuates at the time of the extraction of the oligomerization reaction product containing the bubbles from the reactor, and hence a stable operation becomes difficult. The phenomenon is peculiar to the PC-POS, and is a phenomenon that does not occur in a typical polycarbonate-based resin (polycarbonate resin having a repeating unit represented by the general formula (1), and free of constituent units represented by the general formulae (2), (3), and (4)).

In addition, in order that the content of the PC-POS in the total amount of the organic solvent to be reused in the step (a) may be set to less than the predetermined value, the organic solvent obtained in the step (d) is preferably subjected to one of a treatment with a demister and a distillation treatment, and is particularly preferably treated with the demister.

In the treatment with the demister, a gas mixture is produced by heating the organic solvent obtained in one of the concentrating step and drying step of the step (d) at a temperature in the range of from the boiling point of the organic solvent or more to less than the boiling point of the PC-POS, preferably from 60° C. to 100° C. to vaporize the solvent. After that, the gas mixture is introduced into the demister. A mist-like PC-POS in the gas mixture is captured as droplets in the demister. Meanwhile, an organic solvent gas that has passed the demister is cooled to the boiling point of the organic solvent or less to be liquefied. After that, the liquefied gas is introduced into the reactor of the step (a) to be reused.

Although the structure of the demister is not particularly limited as long as the demister can separate the PC-POS in the organic solvent, the structure is, for example, such a structure that a mist-separating zone formed of a wire mesh or the like is arranged in an upper part in the demister. Although the surface area of the wire mesh is not particularly limited, in normal cases, a wire mesh having a surface area of from about 200 $m^2/m^3$ to about 400 $m^2/m^3$ is preferably used. Although a material for the wire mesh is also not particularly limited, a material that does not cause a trouble such as corrosion, is preferred, and for example, a stainless steel, such as SUS304 or SUS316, is used. The mist-separating zone may be a layer filled with, for example, a metallic or ceramic raschig ring in addition to the wire mesh.

In addition, the droplets each containing the PC-POS captured in the demister may be, and are preferably, extracted from the lower part of the demister to be returned to the step (c) or the step (d).

In addition, with regard to the conditions for the distillation treatment, distillation is preferably performed with, for example, a multistage distillation column having 30 stages to 60 stages under the conditions of a reflux ratio of from 0.3 to 5, preferably from 1 to 4, more preferably from 1 to 3, a pressure of from normal pressure to 0.2 MPa (gauge pressure), a column top temperature of from 35° C. to 70° C., preferably from 35° C. to 45° C., and a column bottom temperature of from 45° C. to 80° C., preferably from 45° C. to 60° C.

In the present invention, the following method may also be preferably adopted: before the organic solvent obtained in the concentrating step and drying step of the step (d) is introduced into the demister, or before the organic solvent is purified by distillation in the distillation column, the organic solvent is passed through a flash drum, and the content of the PC-POS in the total amount of the organic solvent gas at the outlet of the flash drum is controlled to less than 850 ppm by mass, preferably less than 800 ppm by mass, more preferably less than 600 ppm by mass, still more preferably less than 500 ppm by mass.

EXAMPLES

The present invention is more specifically described by way of Examples. However, the present invention is by no means limited by these Examples. In Example 1 below, the amount of a polydimethylsiloxane (PDMS) residue, a viscosity number, a viscosity-average molecular weight (Mv), the amount of an unreacted PDMS, and the reaction ratio of the PDMS were determined by the following methods.

In some of Examples below, the following means was adopted for convenience: the effects of the present invention were confirmed by production of a batch system.

(1. Amount of Polydimethylsiloxane (PDMS) Residue)

The amount was determined by protons of methyl groups in a PDMS by NMR measurement.

(2. Viscosity Number)

The viscosity number was measured in conformity with ISO1628-4 (1999).

(3. Method of measuring Viscosity-Average Molecular Weight (Mv))

The viscosity-average molecular weight (Mv) was calculated from the following relational expression (Schnell's equation) by measuring the limiting viscosity [η] of a methylene chloride solution at 20° C. with an Ubbelohde-type viscosity tube.

$$[\eta]=1.23\times10^{-5}\times Mv^{0.83}$$

(4. Method of Calculating Amount of Unreacted PDMS)

The amount of an unreacted PDMS in $^1$H-NMR was determined by the following method.

(i) To a solution of 6 g of a polycarbonate-polydimethylsiloxane copolymer flake obtained in Example 1 in 50 ml of methylene chloride, 50 ml of acetone and 150 ml of n-hexane were added and mixed, and then the mixture was left to stand still for 30 minutes.

(ii) Suction filtration with filter paper (manufactured by Advantec, No. 5A) was conducted to obtain a filtrate, the recovered filtrate was concentrated to dryness, and the weight of the resultant dry solid was measured. The resultant dry solid was dissolved in deuterated chloroform and subjected to $^1$H-NMR measurement. A proportion z (%) of an unreacted PDMS was calculated from an integrated value x of a proton of a hydroxyl group at the ortho-position of an unreacted phenol-modified polydimethylsiloxane (δ 6.7 ppm) and an integrated value y of a proton assigned to a methylene chain (δ 0.6 ppm) according the following expression.

$$z=2\times x/y\times100$$

(iii) Meanwhile, a standard specimen in which a phenol-modified polydimethylsiloxane was added at from 150 ppm to 2,000 ppm to a polycarbonate-polydimethylsiloxane copolymer substantially free of an unreacted PDMS prepared as a standard sample was separately prepared and subjected to the same operations as those described above, thereby determining a relational expression (standard curve) between z and the amount of an unreacted PDMS (ppm;=the addition amount of a phenol-modified polydimethylsiloxane).

The amount of an unreacted PDMS (ppm) was calculated from the z determined in (ii) and the relational expression determined in (iii).

(5. Reaction Ratio of PDMS)

The reaction ratio of a PDMS was calculated in accordance with the following calculation equation.

Reaction ratio of PDMS(mass %)=(1−amount of unreacted PDMS (mass %)/amount of PDMS residue(mass %))×100

Example 1

A polycarbonate-polydimethylsiloxane copolymer was produced in accordance with a flow illustrated in the FIGURE.

[Production of Polycarbonate Oligomer Solution: Step (a)]

To 5.6 mass % aqueous sodium hydroxide, sodium dithionite was added in an amount of 2,000 ppm by mass relative to bisphenol A to be dissolved later, and bisphenol A was then dissolved therein so that the concentration of bisphenol A became 13.5 mass %, to thereby prepare a solution of bisphenol A in aqueous sodium hydroxide.

The solution of bisphenol A in aqueous sodium hydroxide, methylene chloride, and phosgene were continuously passed through a tubular reactor having an inner diameter of 6 mm and a tube length of 30 mat flow rates of 40 L/hr, 15 L/hr, and 4.0 kg/hr, respectively. The tubular reactor had a jacket portion, and cooling water was passed through the jacket to keep the reaction liquid at a temperature of 40° C. or less.

The reaction liquid that had exited the tubular reactor was continuously introduced into a baffled tank-type reactor having an internal volume of 40 L and provided with a sweptback blade, and then, 2.8 L/hr of the solution of bisphenol A in aqueous sodium hydroxide, 0.07 L/hr of 25 mass % aqueous sodium hydroxide, 17 L/hr of water, and 0.64 L/hr of a 1 mass % triethylamine aqueous solution were further added to the reactor to perform a reaction. The reaction liquid overflown from the tank-type reactor was continuously taken out and left to stand still to separate and remove an aqueous phase, and a methylene chloride phase was then collected.

The concentration of the thus obtained polycarbonate oligomer solution (methylene chloride solution) was 318 g/L, and the concentration of a chloroformate group thereof was 0.75 mol/L. In addition, the polycarbonate oligomer had a weight-average molecular weight (Mw) of 1,190.

The weight-average molecular weight (Mw) was measured as a molecular weight (weight-average molecular weight: Mw) relative to the standard polystyrene with GPC (column: TOSOH TSK-GEL MULTI PORE HXL-M (two)+ Shodex KF801 (one), temperature: 40° C., flow rate: 1.0 ml/min, detector: RI) with tetrahydrofuran (THF) as a developing solvent.

[Production of PC-PDMS: Step (b)]

After 20 L/hr of the polycarbonate oligomer (PCO) solution produced in the step (a) and 9.5 L/hr of methylene chloride had been mixed, a 20 mass % solution of an allylphenol terminal-modified polydimethylsiloxane (PDMS) having a number (n) of repetitions of a dimethylsiloxane unit of 40 in methylene chloride was added at 2.6 kg/hr to the mixture. After that, the materials were mixed well with a static mixer, and then the mixed liquid was cooled to from 19° C. to 22° C. with a heat exchanger.

After 0.5 kg/hr of a 1 mass % solution of triethylamine in methylene chloride had been added and mixed to the cooled mixed liquid, 1.4 kg/hr of 8.0 mass % aqueous sodium hydroxide was added to the mixture. The resultant was supplied to T.K. Pipeline Homomixer 2SL Type (manufactured by Tokushu Kika Kogyo Co., Ltd.) having an internal volume of 0.3 L, the homomixer having a turbine blade having a diameter of 43 mm and a turbine blade having a diameter of 48 mm, and the PCO and the PDMS were caused to react with each other under stirring at a number of revolutions of 4,400 rpm.

Subsequently, the resultant reaction liquid was cooled to from 17° C. to 20° C. with a heat exchanger. After 10.2 kg/hr of a solution of bisphenol A in aqueous sodium hydroxide, 1.5 kg/hr of 15 mass % aqueous sodium hydroxide, and 1.3 kg/hr of an 8 mass % solution of p-t-butylphenol in methylene chloride had been added to the reaction liquid after the cooling, the mixture was supplied to T.K. Pipeline Homomixer 2SL Type (manufactured by Tokushu Kika Kogyo Co., Ltd.) having an internal volume of 0.3 L, the homomixer having a turbine blade having a diameter of 43 mm and a turbine blade having a diameter of 48 mm, and a polymerization reaction was performed under stirring at a number of revolutions of 4,400 rpm.

Further, in order for the reaction to be completed, the resultant was supplied to a tower-type stirring tank having an internal volume of 50 liters and having three paddle blades, and polycondensation was performed. Thus, a polymerization liquid was obtained.

[Separating Step and Washing Step: Step (c)]

35 L of the polymerization liquid obtained in the step (b) and 10 L of methylene chloride were charged into a 50 L tank-type washing tank provided with a baffle board and a paddle-type stirring blade, and were stirred at 240 rpm for 10 minutes. After that, the mixture was left to stand still for 1 hour to be separated into a methylene chloride phase containing the polycarbonate-polydimethylsiloxane copolymer, and an aqueous phase containing excessive amounts of bisphenol A and sodium hydroxide.

The methylene chloride solution containing the polycarbonate-polydimethylsiloxane copolymer (PC-PDMS) thus obtained was sequentially washed with 0.03 mol/L aqueous sodium hydroxide and 0.2 mol/L hydrochloric acid in amounts of 15 vol % each with respect to the solution. Next, the solution was repeatedly washed with pure water so that an electric conductivity in an aqueous phase after the washing became 0.1 mS/m or less.

The concentration of the PC-PDMS in the methylene chloride solution containing the PC-PDMS after the washing was measured. As a result, the concentration was 10 mass %.

[Recovery of PC-PDMS: Step (d)]

The methylene chloride solution containing the PC-PDMS thus obtained was introduced at a flow rate of 100 kg/hr into a concentrator having a volume of 210 L in which a temperature and a pressure were held at 70° C. and 0.2 MPaG, respectively to provide a 28 mass % PC-PDMS concentrated solution [concentrating step], and a methylene chloride gas discharged from the concentrator was recovered. After that, the concentrated solution was subjected to a pulverization treatment, and was dried under reduced pressure and under a condition of 120° C. [drying step].

The polycarbonate-polydimethylsiloxane copolymer (PC-PDMS) obtained as described above had an amount of a polydimethylsiloxane residue of 6.3 mass %, a viscosity number of 47.0, and a viscosity-average molecular weight (Mv) of 17,500. In addition, the amount of an unreacted PDMS was 150 ppm or less, and the reaction ratio of the PDMS was 99.5% or more.

(Treatment with Demister)

Mist containing the PC-PDMS was removed by passing the total amount of the methylene chloride gas recovered in the step (d) at a flow rate of 64 kg/hr through a demister (manufactured by Koch-Glitsch, YORK 431). After that, the methylene chloride gas was cooled at 10° C. to be liquefied. As a result, the recovery ratio of methylene chloride was 99%, and the concentration of the PC-PDMS in the methylene chloride was 100 ppm by mass.

The methylene chloride was introduced as methylene chloride to be used in the step (a) at 15 L/hr into the tubular reactor, and a reaction was performed. After that, the inside of the baffled tank-type reactor of the step (a) was observed. As a result, it was found that no bubbling occurred. In addition, the discharge pressure of a pump at the outlet of the baffled tank-type reactor was stable.

Example 2

Part of the total amount of the methylene chloride gas recovered in the step (d) was introduced at a flow rate of 58 kg/hr into the twentieth stage of a distillation column having 40 stages, and was purified by distillation at a column top temperature of 40° C., a column bottom temperature of 50° C., and a column top reflux ratio of 2.0. Methylene chloride was purified by distillation from the top of the column at a recovery ratio of 99.5%. Methylene chloride obtained by cooling the residue of the methylene chloride gas that had not been purified by distillation at 10° C. to liquefy the residue and the methylene chloride after the distillation purification were mixed. The concentration of the PC-PDMS in the methylene chloride was 180 ppm by mass.

The methylene chloride was introduced as methylene chloride to be used in the step (a) at 15 L/hr into the tubular reactor, and a reaction was performed. After that, the inside of the baffled tank-type reactor of the step (a) was observed. As a result, it was found that no bubbling occurred. In addition, the discharge pressure of a pump at the outlet of the baffled tank-type reactor was stable.

Example 3

Mist containing the PC-PDMS was removed by passing part of the total amount of the methylene chloride gas recovered in the step (d) at a flow rate of 34 kg/hr through a demister (manufactured by Koch-Glitsch, YORK 431). After that, the methylene chloride gas was cooled at 10° C. to be liquefied. As a result, the recovery ratio of methylene chloride was 99%. Methylene chloride obtained by cooling the residue of the methylene chloride gas that had not been treated with the demister at 10° C. to liquefy the residue and the methylene chloride after the treatment with the demister were mixed. The concentration of the PC-PDMS in the methylene chloride was 480 ppm by mass.

The methylene chloride was introduced as methylene chloride to be used in the step (a) at 15 L/hr into the tubular reactor, and a reaction was performed. After that, the inside of the baffled tank-type reactor of the step (a) was observed. As a result, it was found that no bubbling occurred. In addition, the discharge pressure of a pump at the outlet of the baffled tank-type reactor was stable.

Comparative Example 1

The total amount of the methylene chloride gas recovered in the step (d) was cooled at 10° C. to be liquefied. The concentration of the PC-PDMS in the methylene chloride was 900 ppm by mass. The methylene chloride was introduced as methylene chloride to be used in the step (a) at 15 L/hr into the tubular reactor, and a reaction was performed. As a result, the discharge pressure of the pump at the outlet of the baffled tank-type reactor of the step (a) was not stable, and hence it became difficult to continue the operation of the reactor for the production of the PC-PDMS.

INDUSTRIAL APPLICABILITY

The polycarbonate-polyorganosiloxane copolymer obtained by the present invention is expected to find utilization in various fields, such as the field of electrical and electronic equipment and the field of an automobile. In particular, the polycarbonate-polyorganosiloxane copolymer can be utilized as, for example, a material for the casing of a mobile phone, a mobile personal computer, a digital camera, a video camera, an electric power tool, or the like, or a material for other articles for daily use.

REFERENCE SIGNS LIST

1 phosgenation reaction: step (a)
2 oligomerization reaction: step (a)
3 settled separation
4 polycondensation reaction step (b)
5 separating step (c)
6 washing step (c)
7 concentrating step (d)
8 drying step (d)
9 waste water treatment
10 treatment with demister

The invention claimed is:

1. A method of producing a polycarbonate-polyorganosiloxane copolymer, comprising:
   a step (a) of producing a polycarbonate oligomer with an alkaline aqueous solution of a dihydric phenol, phosgene, and an organic solvent, and
   the method further comprising a step of setting a content of a polycarbonate-polyorganosiloxane copolymer in the organic solvent to be introduced into the step (a) to less than 850 ppm by mass,
   wherein the organic solvent to be introduced into the step (a) is obtained by treating part or a total amount thereof with a demister, the demister has a structure that a mist-separating zone formed of a wire mesh is arranged therewith, and a wire mesh having a surface area of from about 200 $m^2/m^3$ to about 400 $m^2/m^3$.

2. The method of producing a polycarbonate-polyorganosiloxane copolymer according to claim 1, further comprising:
   a step (b) of causing the polycarbonate oligomer obtained in the step (a), the alkaline aqueous solution of the dihydric phenol, and a polyorganosiloxane to react with each other to provide a polycarbonate-polyorganosiloxane copolymer;
   a step (c) of continuously or intermittently discharging a solution containing the polycarbonate-polyorganosiloxane copolymer from a reactor of the step (b), separating the discharged solution into an aqueous phase and an organic solvent phase, washing the separated organic solvent phase, and then further separating the washed phase into an aqueous phase and an organic solvent phase; and
   a step (d) of concentrating and drying the organic solvent phase containing the polycarbonate-polyorganosiloxane copolymer obtained in the step (c) to remove the organic solvent,
   wherein part or a total amount of the organic solvent removed in the step (d) is used as the organic solvent to be introduced into the step (a).

3. The method of producing a polycarbonate-polyorganosiloxane copolymer according to claim 1, wherein the organic solvent to be introduced into the step (a) is obtained by subjecting part or a total amount thereof to a distillation treatment.

4. The method of producing a polycarbonate-polyorganosiloxane copolymer according to claim 1, wherein the organic solvent to be introduced into the step (a) is methylene chloride.

5. The method of producing a polycarbonate-polyorganosiloxane copolymer according to claim 1, wherein the dihydric phenol is a dihydric phenol represented by the general formula (1):

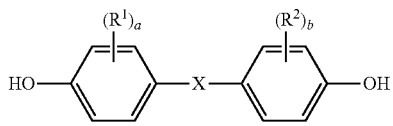

(1)

wherein $R^1$ and $R^2$ each independently represent an alkyl group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —SO$_2$—, —O—, or —CO—, and a and b each independently represent an integer of from 0 to 4.

6. The method of producing a polycarbonate-polyorganosiloxane copolymer according to claim 1, wherein the polyorganosiloxane is at least one of polyorganosiloxane selected from the general formulae (2), (3), and (4):

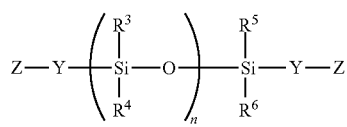

(2)

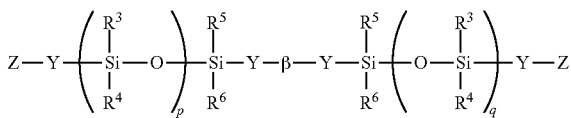

(3)

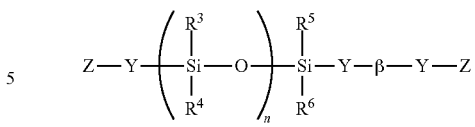

(4)

wherein $R^3$ to $R^6$ each independently represent a hydrogen atom, a halogen atom, an alkyl group having 1 to 6 carbon atoms, an alkoxy group having 1 to 6 carbon atoms, or an aryl group having 6 to 12 carbon atoms, and a plurality of $R^3$, $R^4$, $R^5$, and/or $R^6$ may be identical to or different from each other, Y represents —$R^7$O—, —$R^7$COO—, —$R^7$NH—, —$R^7$NR$^8$—, —COO—, —S—, —$R^7$COO—$R^9$—O—, or —$R^7$O—$R^{10}$—O—, and a plurality of Y may be identical to or different from each other, the $R^7$ represents a single bond, a linear, branched, or cyclic alkylene group, an aryl-substituted alkylene group, a substituted or unsubstituted arylene group, or a diarylene group, $R^8$ represents an alkyl group, an alkenyl group, an aryl group, or an aralkyl group, $R^9$ represents a diarylene group, $R^{10}$ represents a linear, branched, or cyclic alkylene group, or a diarylene group, Z represents a hydrogen atom or a halogen atom, and a plurality of Z may be identical to or different from each other, β represents a divalent group derived from a diisocyanate compound, or a divalent group derived from a dicarboxylic acid or a halide of a dicarboxylic acid, p and q each represent an integer of 1 or more, and a sum of p and q is from 20 to 500, and n represents an average number of repetitions of from 20 to 500.

7. The method of producing a polycarbonate-polyorganosiloxane copolymer according to claim 1, wherein the dihydric phenol is bisphenol A.

8. The method of producing a polycarbonate-polyorganosiloxane copolymer according to claim 1, wherein the alkaline aqueous solution is aqueous sodium hydroxide.

9. The method of producing a polycarbonate-polyorganosiloxane copolymer according to claim 1, wherein the polycarbonate oligomer has a weight-average molecular weight of 5,000 or less.

* * * * *